United States Patent
Nochimowski et al.

(10) Patent No.: US 10,289,349 B2
(45) Date of Patent: May 14, 2019

(54) DATA USAGE PROFILING BY LOCAL STORAGE DEVICE

(75) Inventors: Alain Nochimowski, Tel Aviv (IL);
Micha Rave, Herzliya (IL); Itzhak Pomerantz, Kefar Sava (IL); Eitan Mardiks, Raanana (IL)

(73) Assignee: SanDisk IL, LTD., Kfar Saba (IL)

( * ) Notice: Subject to any disclaimer, the term of this patent is extended or adjusted under 35 U.S.C. 154(b) by 3273 days.

(21) Appl. No.: 12/059,107

(22) Filed: Mar. 31, 2008

(65) Prior Publication Data
US 2009/0172275 A1   Jul. 2, 2009

Related U.S. Application Data (60) Provisional application No. 61/018,644, filed on Jan. 2, 2008, provisional application No. 61/018,979, filed on Jan. 4, 2008.

(51) Int. Cl.
*G06F 12/02* (2006.01)
*G06F 3/06* (2006.01)

(52) U.S. Cl.
CPC .......... *G06F 3/0679* (2013.01); *G06F 3/0604* (2013.01); *G06F 3/0607* (2013.01); *G06F 3/0655* (2013.01); *G06F 3/0664* (2013.01); *G06F 12/0246* (2013.01)

(58) Field of Classification Search
None
See application file for complete search history.

(56) References Cited

U.S. PATENT DOCUMENTS

| | | |
|---|---|---|
| 4,887,234 A | 12/1989 | Iijima |
| 5,509,134 A | 4/1996 | Fandrich et al. |
| 6,745,286 B2 | 6/2004 | Staub et al. |
| 6,748,467 B2 | 6/2004 | Yamamoto |
| 6,934,794 B2 | 8/2005 | Garritsen et al. |

(Continued)

FOREIGN PATENT DOCUMENTS

| | | |
|---|---|---|
| GB | 2 400 707 | 10/2004 |
| JP | H11-296418 A | 10/1999 |

(Continued)

OTHER PUBLICATIONS

Anciaux et al., "A Tamper-Resistant and Portable Healthcare Folder," International Journal of Telemedicine and Applications, vol. 2008, 9 pgs., 2008.

(Continued)

*Primary Examiner* — Charles Rones
*Assistant Examiner* — Ryan Dare
(74) *Attorney, Agent, or Firm* — Brinks Gilson & Lione (57) ABSTRACT

A local storage device (LSD) is provided configured to have a host device (HD) in communication with the LSD. The LSD includes a memory array. The LSD is configured to characterize data access usage of the LSD by at least one program executing on the HD. The LSD is configured to monitor access to the LSD as a result of data access operations by the HD relative to the memory array of the LSD. The LSD is additionally configured to determine characteristics of the monitored access. The LSD is additionally configured to, based on characteristics of the monitored access, determine and store data on the LSD indicative of the characterized monitored access.

20 Claims, 6 Drawing Sheets

(56) References Cited

U.S. PATENT DOCUMENTS

| | | | |
|---|---|---|---|
| 6,986,030 | B2 | 1/2006 | Shmueli et al. |
| 7,085,879 | B2 | 8/2006 | Aasheim et al. |
| 7,143,420 | B2 | 11/2006 | Radhakrishnan |
| 7,209,633 | B1 | 4/2007 | Novak et al. |
| 7,406,489 | B2 | 7/2008 | Soini et al. |
| 7,747,837 | B2 | 6/2010 | Gorobets et al. |
| 2004/0088417 | A1 | 5/2004 | Bober et al. |
| 2004/0117785 | A1 | 6/2004 | Kincaid |
| 2004/0243793 | A1 | 12/2004 | Tang |
| 2005/0160053 | A1 | 7/2005 | Okamoto et al. |
| 2005/0193161 | A1 | 9/2005 | Lee et al. |
| 2005/0203872 | A1* | 9/2005 | Kwong Kwan .......... 707/1 |
| 2005/0268339 | A1 | 12/2005 | Bobrow |
| 2006/0079284 | A1 | 4/2006 | Lu et al. |
| 2006/0107062 | A1 | 5/2006 | Fauthoux |
| 2006/0107330 | A1 | 5/2006 | Ben-Yaacov et al. |
| 2006/0288166 | A1 | 12/2006 | Smith, Jr. et al. |
| 2007/0033373 | A1 | 2/2007 | Sinclair |
| 2007/0038567 | A1 | 2/2007 | Allaire et al. |
| 2007/0050538 | A1 | 3/2007 | Northcutt et al. |
| 2007/0056042 | A1 | 3/2007 | Qawami et al. |
| 2007/0130370 | A1 | 6/2007 | Akaezuwa |
| 2007/0156998 | A1 | 7/2007 | Gorobets |
| 2007/0186279 | A1 | 8/2007 | Zimmer et al. |
| 2007/0198634 | A1 | 8/2007 | Knowles |
| 2007/0198715 | A1 | 8/2007 | Knowles |
| 2007/0198716 | A1 | 8/2007 | Knowles |
| 2007/0198734 | A1 | 8/2007 | Knowles |
| 2007/0218945 | A1 | 9/2007 | Agami et al. |
| 2008/0027983 | A1* | 1/2008 | Erol et al. ............ 707/104.1 |
| 2008/0052781 | A1 | 2/2008 | Bogot et al. |
| 2008/0096559 | A1 | 4/2008 | Phillips et al. |
| 2008/0126680 | A1* | 5/2008 | Lee et al. ............... 711/103 |
| 2008/0147962 | A1 | 6/2008 | Diggs et al. |
| 2008/0147964 | A1 | 6/2008 | Chow et al. |
| 2008/0270725 | A1 | 10/2008 | Roden et al. |
| 2008/0301396 | A1* | 12/2008 | Hamada et al. ........ 711/202 |
| 2009/0043984 | A1 | 2/2009 | Chang et al. |
| 2009/0094160 | A1 | 4/2009 | Webster et al. |
| 2009/0171891 | A1 | 7/2009 | Nochimowski et al. |
| 2009/0171911 | A1 | 7/2009 | Nochimowski et al. |
| 2009/0172050 | A1 | 7/2009 | Nochimowski et al. |
| 2009/0172217 | A1 | 7/2009 | Nochimowski et al. |
| 2009/0172274 | A1 | 7/2009 | Nochimowski et al. |
| 2009/0172276 | A1 | 7/2009 | Nochimowski et al. |
| 2009/0172400 | A1 | 7/2009 | Rave et al. |
| 2009/0172694 | A1 | 7/2009 | Nochimowski et al. |

FOREIGN PATENT DOCUMENTS

| | | | |
|---|---|---|---|
| JP | 2002-163577 A | | 6/2002 |
| JP | 2003-058487 A | | 2/2003 |
| JP | 2005-056077 A | | 3/2005 |
| JP | 2005-522098 A | | 7/2005 |
| WO | WO 01/88780 A1 | | 11/2001 |
| WO | WO 2005/125072 | | 12/2005 |
| WO | WO 2006/014791 | | 2/2006 |
| WO | WO 07/019258 | | 2/2007 |
| WO | WO 2007/044947 | | 4/2007 |
| WO | WO 2007/138584 | | 12/2007 |

OTHER PUBLICATIONS

Melazzi et al., "The Simplicity Project: easing the burden of using complex and heterogeneous ICT devices and services," URL: http://www.ist-simplicity.org/_publications/Mobile%20Summit%202004%20-%20Paper%20Stat%20of%20Art.pdf, 8 pages.

Wang, Jinghua, "VHE Smart Card Manager," URL: http://jerry.c-lab.de/vhelab/r_smartcard.html, Feb. 7, 2003.

Machine translation of WO 01/088780, 12 pages.

Baird et al., "Distributed Information Storage Architecture," Twelfth IEEE Symposium on Mass Storage Systems, 1993, pp. 1051-9173.

U.S. Appl. No. 11/967,938, filed Dec. 31, 2007.

U.S. Appl. No. 11/964,060, filed Dec. 26, 2007.

www.allinyourpocket.com, "All your files in your pocket!" downloaded Apr. 15, 2008.

Office Action dated Dec. 27, 2010 in U.S. Appl. No. 12/029,356.

Sim Application Toolkit (SAT) [online], May 19, 2007 [retrieved on Dec. 13, 2010] from URL: http://www.sanjayahuja.com/tutorials/SimApplicationToolkit.html.

Office Action dated Dec. 7, 2010 in U.S. Appl. No. 12/101,065.

Search Report dated Sep. 10, 2010 in EP Application No. 10 007 973.0.

International Search Report dated Aug. 7, 2009 in PCT Application No. PCT/US2008/087695.

Written Opinion dated Aug. 7, 2009 in PCT Application No. PCT/US2008/087695.

Potter et al., "WebPod: Persistent Web Browsing Sessions with Pocketable Storage Devices," Proceedings of the 14th International Conference on the World Wide Web, [Online] May 14, 2005, pp. 603-612.

Lahti et al., "A Mobile Phone-based Context-aware Video Management Application," Proceedings of SPIE—The International Society for Optical Engineering 2006 SPIE, vol. 6074.

Ravi et al., "Securing Pocket Hard Drives," IEEE Pervasive Computing, IEEE Service Center, Los Alamitos, CA, vol. 6, No. 4, Oct. 1, 2007, pp. 18-23.

Office Action dated Sep. 3, 2010 in U.S. Appl. No. 12/123,252.

Office Action dated Oct. 5, 2010 in U.S. Appl. No. 12/123,304.

Office Action for U.S. Appl. No. 12/029,356, dated Mar. 25, 2011, 40 pages.

Office Action for U.S. Appl. No. 12/019,573, dated Mar. 1, 2011, 33 pages.

Office Action for U.S. Appl. No. 12/123,304, dated Mar. 11, 2011, 12 pages.

Office Action for U.S. Appl. No. 12/101,065, dated Feb. 25, 2011, 8 pages.

Office Action for U.S. Appl. No. 12/177,006, dated Nov. 24, 2010, 11 pages.

Office Action for U.S. Appl. No. 12/177,006, dated Mar. 15, 2011, 8 pages.

Hennessy et al., *Computer Organization and Design*, Morgan Kaufmann Publishers, Inc., second edition, pp. 675-678.

Mani et al., SenSys '06, Nov. 1-3, 2006, Boulder, Colorado, USA ACM, pp. 425-426.

Zeinalipour-Yazti et al., "MicroHash: An Efficient Index Structure for Flash-Based Sensor Devices," Fast 05, pp. 1-14.

Notice of Allowance for U.S. Appl. No. 12/019,573, dated Oct. 10, 2012, 8 pages.

Notice of Allowance for U.S. Appl. No. 12/036,440, dated Sep. 26, 2012, 19 pages.

Notice of Allowance for U.S. Appl. No. 12/045,472, dated Sep. 13, 2012, 5 pages.

Notice of Allowance for U.S. Appl. No. 12/177,006, dated Oct. 4, 2012, 9 pages.

Office Action for U.S. Appl. No. 13/355,146, dated Nov. 28, 2012, 17 pages.

Office Action for Chinese Patent Application Serial No. 201010506295.1, dated Nov. 5, 2012, 14 pages.

Office Action for Japanese Patent Application Serial No. 2010-541483, dated Dec. 4, 2012, 11 pages.

Ex Parte Quayle Action for U.S. Appl. No. 12/019,573, dated Jul. 17, 2012, 5 pages.

Notice of Allowance for U.S. Appl. No. 12/036,440, dated Jun. 22, 2012, 14 pages.

Office Action for U.S. Appl. No. 12/101,065, dated Jun. 19, 2012, 10 pages.

Office Action for U.S. Appl. No. 12/123,252, dated Jul. 2, 2012, 13 pages.

Notice of Allowance for U.S. Appl. No. 12/177,006, dated May 30, 2012, 10 pages.

Office Action for U.S. Appl. No. 13/355,146, dated Jul. 16, 2012, 17 pages.

Kubiatowicz et al., "OceanStore: An Architecture for Global-Scale Persistent Storage", *A.C.M.*, 2000, pp. 190-201.

(56) References Cited

OTHER PUBLICATIONS

Examination Report issued in European application No. 08 870 111.5, dated Jan. 20, 2011 (6 pages).
Examination Report issued in European application No. 10 007 974.8, dated Jan. 20, 2011 (6 pages).
Notice of Allowance issued in U.S. Appl. No. 12/045,472, dated Oct. 27, 2011 (5 pages).
Office Action issued in U.S. Appl. No. 12/019,573, dated Dec. 8, 2011 (27 pages).
Office Action issued in U.S. Appl. No. 12/036,440, dated Mar. 5, 2012 (27 pages).
Office Action issued in U.S. Appl. No. 12/045,472, dated May 9, 2011 (12 pages).
Office Action issued in U.S. Appl. No. 12/101,065, dated Feb. 9, 2012 (9 pages).
Office Action issued in U.S. Appl. No. 12/177,006, dated Dec. 7, 2011 (10 pages).

* cited by examiner

DATA USAGE PROFILING BY LOCAL STORAGE DEVICE

CROSS REFERENCE TO RELATED APPLICATIONS

This patent application claims the benefit of priority under 35 U.S.C. 119(e) to U.S. Provisional Patent Application No. 61/018,644 filed on Jan. 2, 2008 entitled "DISTRIBUTED STORAGE SERVICE SYSTEMS AND ARCHITECTURE" by Nochimowski et al.; U.S. Provisional Patent Application No. 61/018,979 filed on Jan. 4, 2008 entitled "DISTRIBUTED STORAGE SERVICE SYSTEMS AND ARCHITECTURE" by Nochimowski et al., both of which are incorporated by reference herein in their entirety. This patent application is related to co-pending U.S. patent application Ser. Nos. i) 12/029,356 entitled "STORAGE DEVICE HAVING DIRECT USER ACCESS" by Nochimowski et al., filed Feb. 11, 2008; ii) 12/019,573 entitled "DISTRIBUTED STORAGE SERVICE SYSTEMS AND ARCHITECTURE," by Nochimowski et al., filed Jan. 24, 2008; iii) 12/036,440 entitled "CACHE MANAGEMENT" by Nochimowski et al., filed Feb. 25, 2008; iv) 12/045,472 entitled "DIGITAL CONTENT DISTRIBUTION AND CONSUMPTION," by Rave et al., filed Mar. 10, 2008; v) 12/101,065 entitled "STORAGE DEVICE HAVING REMOTE STORAGE ACCESS", by Nochimowski et al., filed Apr. 10, 2008; vi) 12/123,252 entitled "DATA INDEXING BY LOCAL STORAGE DEVICE," by Nochimowski et al., filed May 19, 2008; vii) 12/123,304 entitled "DATA INDEXING BY LOCAL STORAGE DEVICE," by Nochimowski et al., filed May 19, 2008; and viii) 11/967,938 entitled LOCAL PROXY SYSTEM AND METHOD by Mosek et al., filed Dec. 31, 2007, all of which are incorporated by reference for all purposes

TECHNICAL FIELD

The present invention relates to a local storage device having a memory array and no local storage device file management system to manage the array. More particularly, the present invention relates to a local storage device that includes capability to profile logical usage of the local storage device by monitoring access to the memory array of the local storage device by a host device file system.

BACKGROUND

Mass storage devices (such as FLASH memory devices that includes SD and MMC type mass storage devices) have increased greatly in both storage capacity and in the capabilities (i.e., processing resources) of associated mass storage device controllers. This increase in available storage capacity has had a synergistic effect on the general availability of devices ("host devices") whose capabilities can depend greatly on available memory. Such devices include portable digital devices such as portable media players, interactive personal communication devices (cell phones, PDAs, etc.) and the like. In this way, a digital consumer's exposure to digital products that use the storage capability of mass storage devices such as FLASH memory has greatly increased.

This exposure typically spans across multiple host devices—connected or unconnected—or access modes—wired vs. wireless, fixed vs. mobile etc.—each having specific storage requirements. A proposed configuration to monitor data usage (such as for targeting advertisements, suggesting content for purchase, assisting in searches, etc) includes, generally, having a different host-specific program being used for each host device. That program is typically installed on the host device and/or on a remote server to which the host device is always or occasionally connected.

The proposed data usage monitoring configuration, then, generally includes a program that is tightly coupled to particular features of the data usage program in the host device. Therefore, it can be difficult to correlate the usage information for a particular consumer that is obtained from multiple host devices used by that particular consumer. Furthermore, such a usage monitoring program that is tightly coupled to a host device generally must be customized to operate with that host device. Yet further, having the host device highly involved in data usage monitoring can take processing power from the host device that may be desired or required for other functions.

Therefore, a data usage monitoring method, system, and apparatus that addresses these shortcomings is desirable.

SUMMARY

In accordance with one aspect, a computing device having a host device (HD) is in communication with a local storage device (LSD), wherein the LSD includes a memory array. A method characterizes data access usage of the LSD by at least one program executing on the HD. The method includes, by the LSD, monitoring access to the LSD as a result of data access operations by the HD relative to the memory array of the LSD. By the LSD, characteristics of the monitored access are determined. By the LSD, based on characteristics of the monitored access, data is determined and stored on the LSD indicative of the characterized monitored access.

In accordance with an additional aspect, an LSD is provided configured to have an HD in communication with the local storage device. The LSD includes a memory array. The LSD is configured to characterize data access usage of the LSD by at least one program executing on the HD. The LSD is configured to monitor access to the LSD as a result of data access operations by the HD relative to the memory array of the LSD. The LSD is additionally configured to determine characteristics of the monitored access. The LSD is additionally configured to, based on characteristics of the monitored access, determine and store data on the LSD indicative of the characterized monitored access.

In accordance with an additional aspect, a computing system includes an HD and an LSD. The HD executes at least one program. The LSD includes a memory array. The LSD is configured to characterize data access usage of the LSD by at least one program executing on the HD. The LSD is configured to monitor access to the LSD as a result of data access operations by the HD relative to the memory array of the LSD. The LSD is additionally configured to determine characteristics of the monitored access. The LSD is additionally configured to, based on characteristics of the monitored access, determine and store data on the LSD indicative of the characterized monitored access.

DETAILED DESCRIPTION

The inventors have realized the desirability of providing functionality in a local storage device (LSD) to monitor access to a memory array of the LSD by a host device (HD). More particularly, the inventors have realized the desirability of providing such functionality to determine characteristics of the monitored access and to store data on the LSD indicative of the characterized data access.

Thus, for example, the logical usage of the LSD may be monitored and characterized, even when such usage of the LSD is the result of the LSD being used by multiple HD's. Furthermore, the monitoring and characterizing functionality need not be ported to various HD platforms, since the functionality is independent of HD platform.

Reference will now be made in detail to particular embodiments of the invention an example of which is illustrated in the accompanying drawings. While the invention will be described in conjunction with the particular embodiments, it will be understood that it is not intended to limit the invention to the described embodiment. To the contrary, it is intended to cover alternatives, modifications, and equivalents as may be included within the spirit and scope of the invention as defined by the appended claims.

With the increase of the capabilities of storage device controllers, the execution of software applications from within the storage device using processing resources made available by the storage device controllers becomes possible. This enhanced operability of the storage device controllers leads to a paradigm of new monitoring and characterization modes which are, for example, useful to monitor and characterize usage of user-oriented storage services. Usage monitoring and characterization of such user oriented storage services can be used for improving a user's digital content consumption experience that typically spans across multiple devices—connected or unconnected—or access modes—wired vs. wireless, fixed vs. mobile etc.—each having specific storage requirements.

The usage characterization may be, for example, provided to a service provider that in return provides the user with better services or lower cost services, or may provide the user with an application that accesses the usage characterization data and provides the user with different kind of services. For example, a retailer may provide a user with a subsidized removable storage device (card/USB storage). For example, the storage device may contain pre-loaded content and the user may also be encouraged to download content (such as from a web site associated with the retailer). In return the user may provide consent for a content usage profile to be provided from the storage device and, for example, possibly even receive focused proposals from the retailer and/or associated entities. As another example, capabilities of the storage device may be adjusted relative to perceived needs of the end user. Such capabilities may include, for example, flash/cache management, partition sizes, and searching preferences. Storage device vendors may be enabled to provide targeted services to their customer base.

In order to provide support to "user-centric" (as opposed to traditional "device-centric") storage usage characterization approach, the invention goes beyond the strict limitations of the host managed, LBA-based mass storage paradigm and provides a storage services characterization paradigm that may be fully backward compatible with legacy mass storage devices but also enhances the characterization of mass storage usage. In addition, the reporting of such characterization need not depend on storage usage characterization functionality in a host device.

The invention can further pertain to an electronic system that includes a memory device discussed above. Memory devices (e.g., memory cards) are commonly used to store digital data for use with various electronics products. The memory device is often removable from the electronic system so the stored digital data is portable. The memory devices according to the invention can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices), and medical monitors.

Embodiments of the invention are discussed below with reference to FIGS. 1 to 6. However, those skilled in the art will readily appreciate that the detailed description given herein with respect to these figures is for explanatory purposes as the invention extends beyond these limited embodiments. It should be noted that it is contemplated that the invention can be used for any type of local data storage devices that can include non-volatile memory such as Multi Media Card (MMC) and Secure Digital Card (SD).

Figure 1:
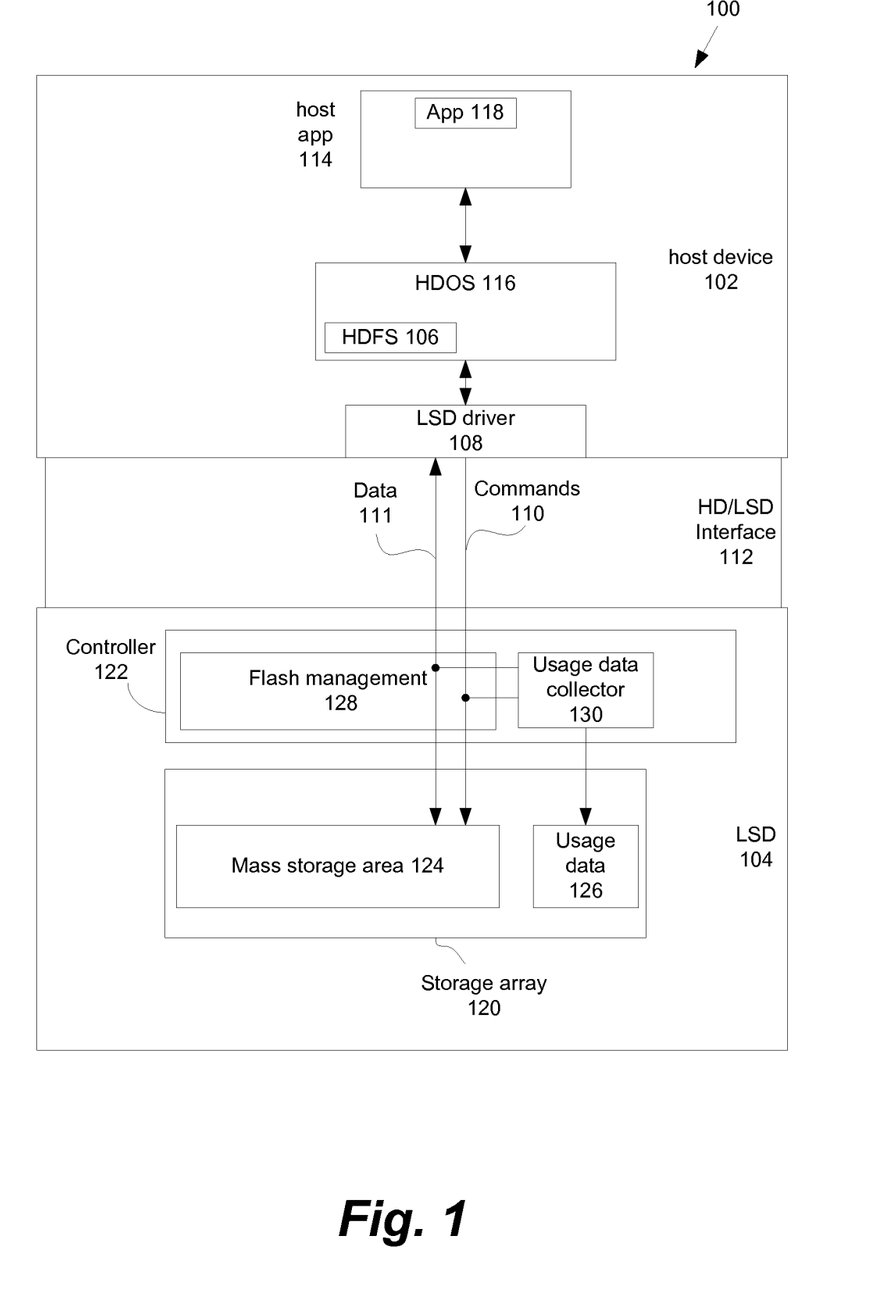
FIG. 1 illustrates a computing system including a host device (HD) and a local storage device, wherein the LSD is configured to monitor access to a memory array of the LSD by the HD.

FIG. 1 illustrates a computing system 100 including a host device (HD) 102 and a local storage device (LSD) 104. HD 102 includes a host device file system (HDFS) 106. LSD 104 can take the form of removable memory devices such as a memory card having a relatively small form factor and can be used to store digital data for electronics products such as cameras, hand-held or notebook computers, network cards, network appliances, set-top boxes, hand-held or other small audio players/recorders (e.g., MP3 devices), and medical monitors. Examples of a memory card include PC Card (formerly PCMCIA device), Flash card (e.g., Compact Flash Type I and II), Secure Digital (SD) card, Multimedia card (MMC), ATA card (e.g., Compact Flash card), memory stick, SmartMedia card. In addition, LSD 204 can take the form of non-removable memory devices such as SD compatible iNAND™ embedded Flash drive manufactured by SanDisk Corporation of Milpitas Calif.

LSD 104 can communicate with HD 102 by way of HD/LSD interface 112. It should be noted that HD/LSD 112 can be configured as a mechanical entity (such as a socket or interconnecting bus) into which HD 102 and LSD 104 can mechanically connect. In some embodiments, HD/LSD interface 108 can take the form of a wireless interface. Generally, HD 102 includes a processor. However, for the sake of clarity, the processor included in HD 102 is neither shown nor mentioned further in this discussion but is, nonetheless, presumed to be present. LSD 104 can be physically connected exclusively to HD 102 and therefore does not access or otherwise communicate with circuits and/or applications external to computing system 100 without intervention by HD 102. Typically, LSD 104 does not utilize any interface to a device external to HD 102 other than that interface provided by the HD 102 though, in some cases, LSD 104 may directly interface to a device external to HD 102.

HD 102 includes host device file system (HDFS) 106 in communication with LSD driver 108. In the described embodiment, HDFS 106 can issue LSD management command 110 to LSD driver 108. LSD driver 108 can, in turn, pass LSD management command 110 (appropriately formatted) to LSD 104 by way of HD/LSD interface 112. For example, LSD management command 110 can take the form of a block command in those cases where LSD 104 is configured to include a data storage array having logical block address (LBA) architecture. LSD management commands 110 result in the flow of data 111 between LSD 104 and HD 102.

HD 102 can also include (internal) software application 114. By internal application it is meant that software application 114 can utilize HDFS 106 (which is typically part of the host device operating system 116) and LSD driver 108 to communicate with LSD 104. Such software applications can include an application 118 each of which typically resides in host device main memory (that can take the form of a hard disk drive, or HDD, as well as non-volatile memory such as FLASH memory).

For example, computing system 100 can be a portable media player, and application 118 may be a media player application. In this case, for example, LSD 204 may store various digital media files such as audio files in the form of MP3, video/audio files in the form of MP4 or still photograph files in the form of JPEG. The LSD management commands 110 may be, for example, data access commands to retrieve the data of the files from LSD 104.

In the FIG. 1 example, the data access commands may be HDFS commands to read a portion of a file allocation table (FAT) stored in a mass storage area 120 of the LSD 104 and to then read one or more data blocks from the mass storage area 120. For example, the mass storage area 120 may be a memory array and the mass storage area may be managed by the HDFS 106 and not by a file system local to the LSD 104. For example, LSD 104 can include controller 122 and mass storage array 120 having a first storage area 124 and second storage area 126. It should be noted that storage array 120 can be formed of an array of memory cells (such as FLASH). In this particular case, even though mass storage array 120 can be presumed to be an array of FLASH memory cells, the invention is not limited to only FLASH type memory cells since it is contemplated that the invention can be used with any appropriate type of memory cell.

Controller 122 includes flash manager 128 that can manage first storage area 124, acting at the behest of HDFS 208. In a particularly useful arrangement, first storage area 124 can be an LBA based mass storage array. Accordingly, the location of blocks of data stored in first storage area 124 can be specified using logical block addressing (LBA) where each block can be, for example, on the order of 512 or 1024 bytes each. In this way, first storage area 124 can be fully backward compatible with any contemplated legacy mass storage architectures (i.e. able to work in conjunction with legacy hosts) and more specifically LBA type systems. In particular, LSD 104 (in particular, first storage area 124) can operate under standard LBA architecture using legacy interfaces, busses, and all associated protocols providing for full compatibility with an installed base of legacy products.

Controller 122 further includes usage data collector functionality 130 that is configured to monitor and characterize data access to the first storage area 124 by the HD 102. In one example, the monitoring includes discerning the data content being transferred between the first storage area 124 and the HD 102 and, based thereon, characterizing the data access to the first storage area 124. In another example, the monitoring includes discerning one or more patterns of data accesses to the first storage area 124 by the HD 102 and, based thereon, characterizing the data access to the first storage area 124. In yet another example, the monitoring includes a combination of discerning the data content being transferred between the first storage area 124 and the HD 102 and discerning one or more patterns of data accesses to the first storage area 124 by the HD 102 and, based thereon, characterizing the data access to the first storage area. In any case, the monitoring and characterizing is done by the LSD 104 and the characterization is stored as "usage data" in the second storage area 126 of the mass storage array 120.

Figure 2:
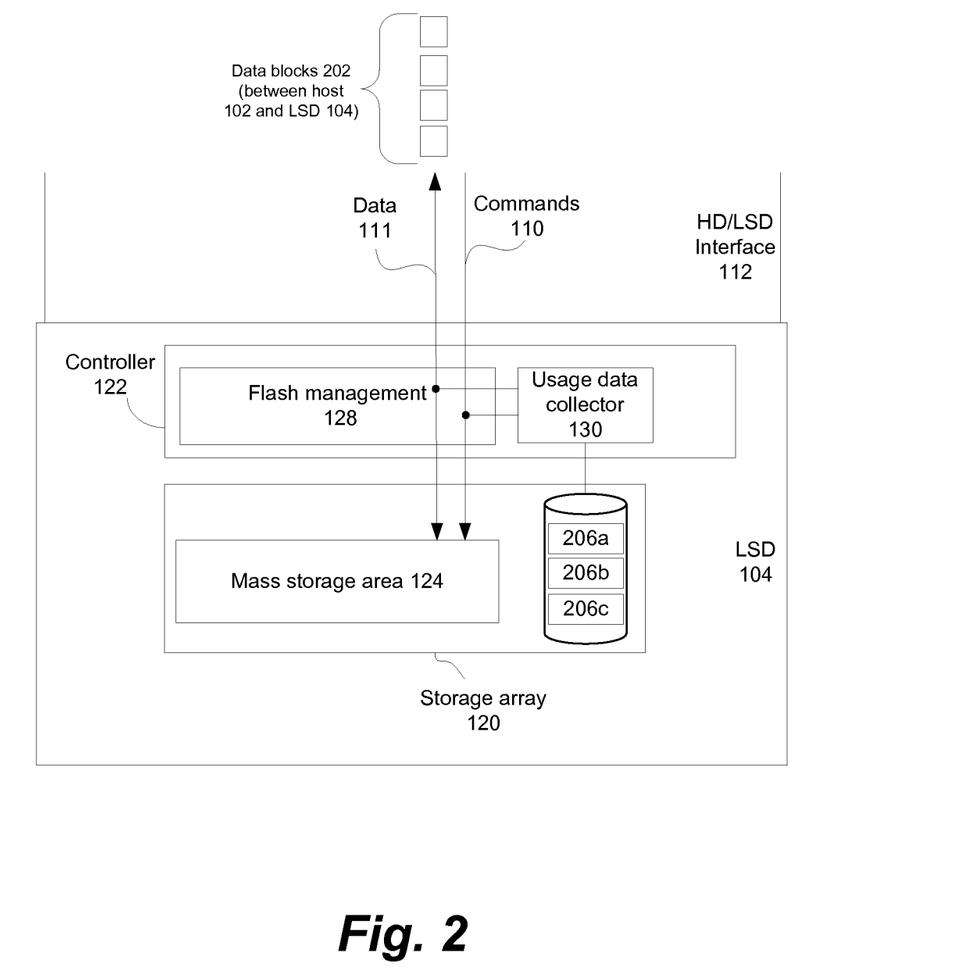
FIG. 2 illustrates examples of the data access monitoring and characterization.

FIG. 2 illustrates examples of the data access monitoring and characterization. Referring to FIG. 2, commands 110 are provided from the HD 102 to the LSD 104 via the HD/LSD interface 112. As discussed above, the commands 110 are provided to the flash manager 128 of the controller 122 to manage first storage area 124 acting at the behest of HDFS 106 (FIG. 1). The usage data collector 130 observes the commands 110 and, based thereon, determines data access characterizations such as, for example, usage counters 206 (such as individual usage counters 206a, 206b and 206c) to be stored in the second storage area 126 of the storage array 120.

While the commands 110 are provided to the flash manager 128 of the controller acting at the behest of HDFS 208, in other examples, commands or other signals are provided from the HD 102 to the LSD 104 that are not as a result of HDFS operations. For example, such command or other signals may be provided based on other operations, such as driver level operations that are not as a result of HDFS operations.

The data access characterizations 206 (or, more generally, the usage data 126 in FIG. 1) may be inferred by the usage data collector 130 based on the frequency of read and/or write operations to characterize the data access. Typically, for the patterns discussed here, the characterization may be achieved with a fair probability level, but typically not at one hundred percent probability. For example, such characterization may distinguish between the data being video, music or photo. The characterization may distinguish between a data consumer versus a data creator. For example, if it discerned by the usage data collector 130 that the HD 102 provides as a command 110 a single data read command that is a read data block command, and there are no further corresponding data read commands, then it may characterize that a photo read, by the HD 102, has occurred from the first storage area 124. As another example, if it discerned by the usage data collector 130 that the HD 102 provides a command 110 to read the File Allocation Table (FAT) of the first storage area 124 (presumably to map the data location), and then the usage data collector 130 discerns that the HD 102 provides commands 110 to read data blocks from the first storage area 124 at a fixed rate/throughput, then the monitor can characterize this group of commands as a read of a music file from the first storage area 124. As yet another example, if it discerned by the usage data collector 130 that the HD 102 provides a command 110 to read the File Allocation Table (FAT) of the first storage area 124 (presumably to map the data location), and then the usage data collector 130 discerns that the HD 102 provides commands 110 to read data blocks from the first storage area 124 at a variable rate/throughput, then the monitor can characterize this group of commands as a read of a video file from the first storage area 124. (In some cases, though, the FAT data may be cached in the HD, so it may be difficult or impossible to correlate subsequent data access commands to the FAT read.) These are examples of what the usage data collector 130 can discern from the commands 110 from the HD 102 to the LSD 104 and other examples are possible. While many of the examples herein are relative to read data access, the data access being characterized may also (or instead) include write data access, such as write data access to load media files into the first storage area 124.

While these are examples of data access patterns, it should be understood that the patterns can be pre-loaded in the LSD 104 (possibly even dynamically updated, examples of which are discussed later in this patent application) and used as a reference to identify specific types of data access by the usage data collector 130. In use, the patterns may be quite simple, as in the examples, or may be much more complex.

Still referring to FIG. 2, the usage data collector 130 may discern the content of data blocks 202 being transferred between the HD 102 and the first storage area 124 of the LSD 104 (e.g., in either or both of a read and write direction). For example, the usage data collector 130 may discern the content of a data block includes the string "JFIF," and the monitor may characterize the data block as corresponding to a photo (JPEG). As another example, an MP3 file typically has "tags" starting with the string "ID3", PDF files starts with "%PDF", and mp4 video files include the string "ftyp3gp." Thus, for example, each "tag" may be considered as one specific pattern type, which can be manipulated like any other pattern, such as being pre-loaded, updated, or otherwise.

The second storage area 126 may include collective indications of the characterizations determined by the usage data collector 130. For example, in FIG. 2, the second storage area 126 includes usage counters in which the usage data collector 130 accumulates a count of each type of characterization, such as a count for photo characterizations, a count for music characterizations and a count for video characterizations. In addition to characterizing the type of content being accessed (e.g., whether by discerning the content itself or by discerning patterns of access, or some combination of both), the usage data collector 130 may also record frequency or rate of access to particular types of data blocks and/or files (which may be, for example, an indication of the frequency or rate of access for each of a plurality of different time periods).

The information used to make the characterizations (e.g., usage patterns, content rules, etc.) may be stored in the storage array 120, possibly even invisible to the HDFS 106. Such information may be updated by an external application/server (an example of which is described later relative to FIG. 5.)

Having described some examples of how usage data may be generated by the LSD 104, we now discuss some examples of how the usage data may be used. In general, the usage data may be used by the LSD 104 itself, by the HD 102 and/or by an external process. We discuss various examples with reference to FIGS. 3, 4 and 5.

Figure 3:
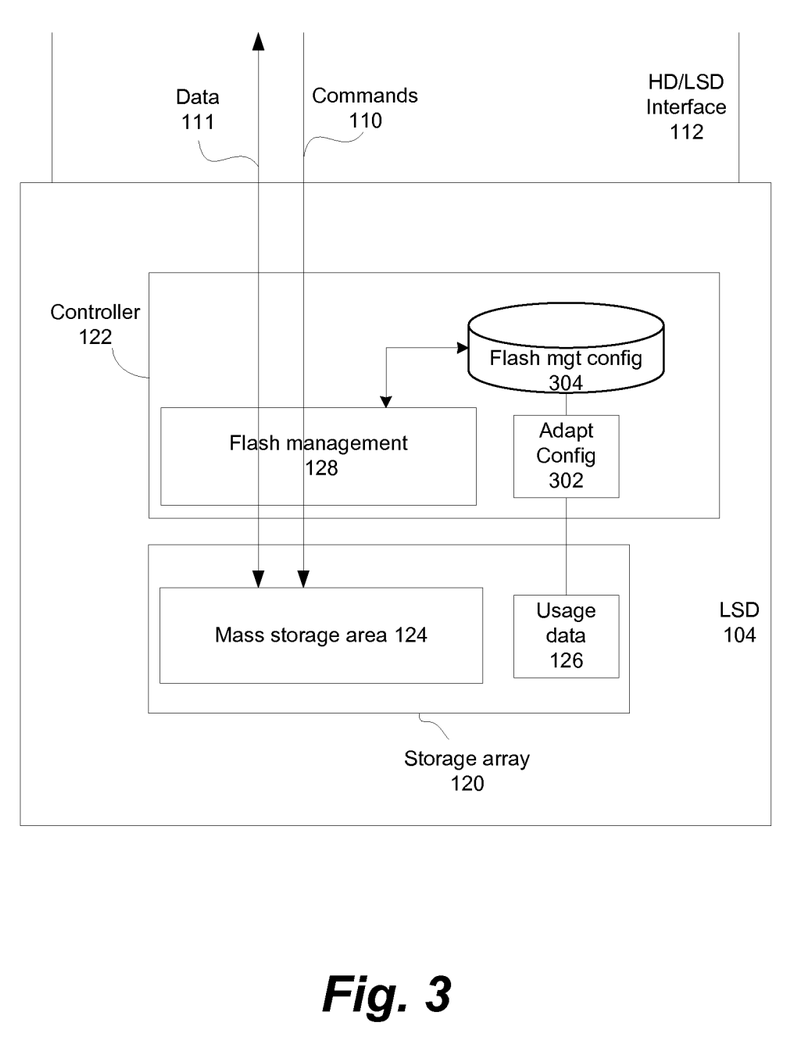
FIG. 3 shows an example configuration of a system in which the usage data may be used by the LSD itself.

Referring now to FIG. 3, this shows an example configuration of a system in which the usage data may be used by the LSD 104 itself. In the example, the flash manager 128 operates at least in part according to a flash management configuration 304. For example, the flash management configuration 304 may define or affect how the flash manager 128 operates with respect to wear-leveling of memory cells of the mass storage area 124, how the flash manager 128 operates with respect to pre-fetching or smart data ordering, etc. As shown in FIG. 3, the flash manager 128 may include an adapt configuration process 302 that processes the usage data 126 to modify the flash management configuration 304. Thus, the operation of the flash manager 128 may be adapted to usage of the LSD as characterized by the LSD itself.

Figure 4:
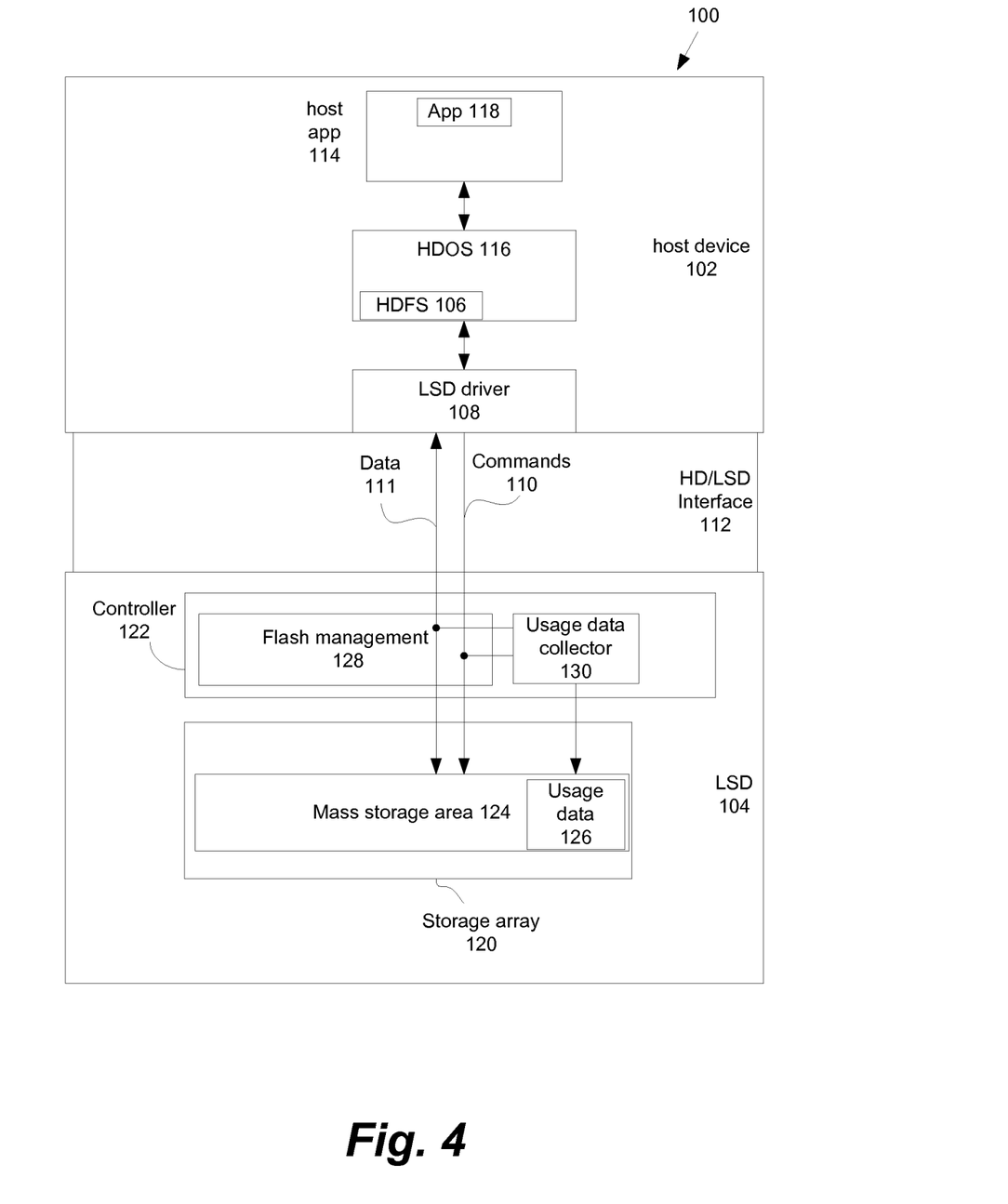
FIG. 4 shows an example configuration of a system in which the usage data may be obtained and/or used by the HD.

FIG. 4 shows an example configuration of a system in which the usage data may be obtained and/or used by the HD 102. In the FIG. 4 example configuration, the usage data 126 is stored within the mass storage area 124 of the storage array 120. See, for example, U.S. patent application Ser. No. 12/029,356, referenced above in the "Related Applications" section, which describes an example of a method to write into the mass storage area of an LSD even though this area is managed by an external file system (HDFS). In this case, the usage data 126 is accessible to the HD 102 using operations that may otherwise be used to generally access data in the mass storage area 124. Thus, for example, an application 118 executing on the HD 102 may operate such that the HDFS 106 causes commands 110 to be provided to LSD 104 via LSD driver 108 and HD/LSD interface 112. Such commands 110 may be provided to flash manager 128 to cause usage data 126 to be provided to HD 102 as data 111 via HD/LSD interface 112.

The usage data thus obtained by HD 102 may be used, for example, by an application 118 being executed by the HD 102. The usage data thus obtained may be provided from the HD to an external device or system, such as to a media management system on a computer or other server to which HD 102 may be connected. Such usage data may be used by that external device or system, for example, in at least partial determination of how that external device or system interacts with HD 102 or otherwise operates.

Figure 5:
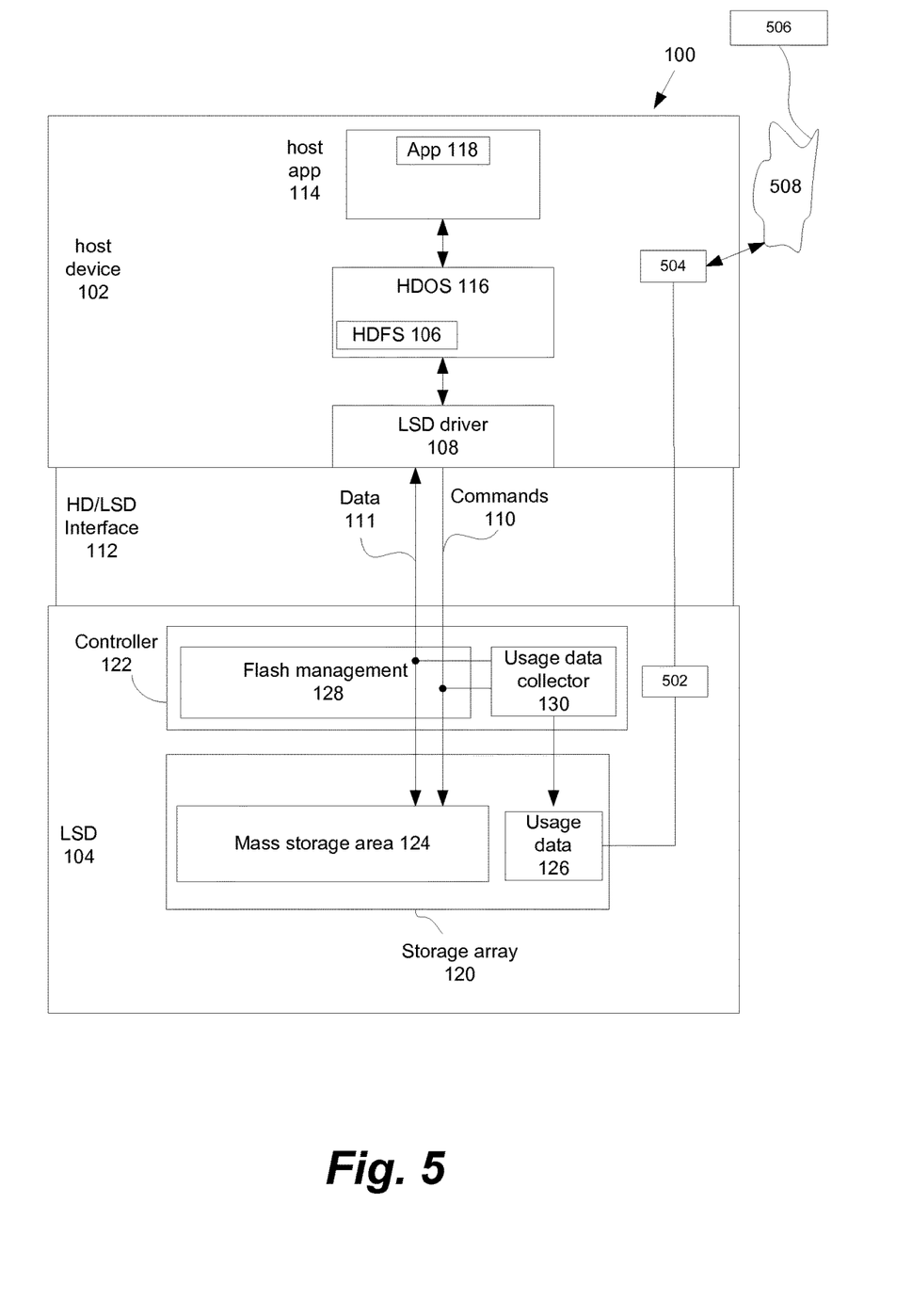
FIG. 5 illustrates an example configuration in which the usage data may be transferred to an external device outside of a master/slave paradigm.

FIG. 5 illustrates an example configuration in which the usage data may be transferred to an external device (such as device 506 coupled to HD 102 via a network 508) outside of a master/slave paradigm such as implemented, for example, by the host application 114, HDFS 106 and LSD driver 108 in cooperation with processing of LSD 104. An example of data transfer outside a conventional master/slave (or host/slave) paradigm is described, for example, in U.S. patent application Ser. No. 12/029,356, referenced above in the "Related Applications" paragraph.

Referring still to FIG. 5, an agent 502 on LSD 104 is in communication with an agent 504 on HD 102. Thus, for example, communication between agent 502 on LSD 104 and agent 504 on HD 102 may be via a secure path that does not require intervention by HDFS 106 and/or such that the transferred usage data is not otherwise accessible to processing (such as host application 114) on HD 102.

Furthermore, device 506 may also perform storage operations (as mentioned above) regarding the usage data collector, such as to clear a profiling record (e.g., resetting counters 206a to 206c in FIG. 2), modifying information used to make the data access characterizations, or other such information.

Figure 6:
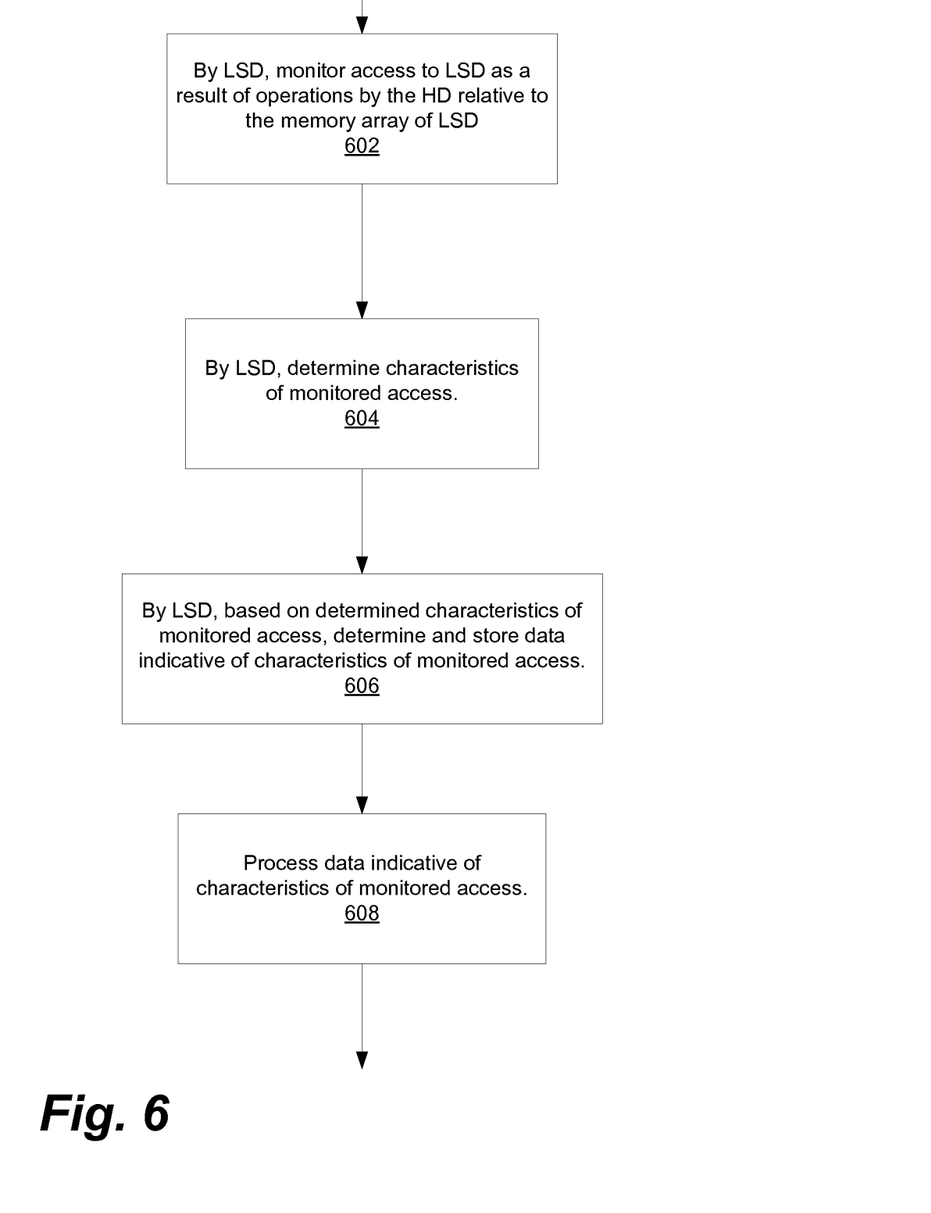
FIG. 6 is a flowchart illustrating, in a broad aspect, a method by which an LSD may determine data indicative of usage of a memory array of the LSD.

We now turn to FIG. 6, which is a flowchart illustrating, in a broad aspect, a method by which an LSD may determine data indicative of usage of a memory array of the LSD. Referring to FIG. 6, at 602, the LSD monitors access to the LSD as a result of operations by the HD relative to the memory array of the LSD. As discussed above, this may be via signals (such as data access commands) provided from an HD to the LSD, relative to the memory array of the LSD. For example, as discussed above, such data access signals may be, but need not necessarily be, a result of HDFS operations.

At 604, the LSD determines characteristics of the monitored access. For example, as discussed above, such determining may be based on data access commands from the HD to the LSD (such, as, for example, characteristics of the command collectively, such as an access pattern), may be based on content of accessed data, or some combination of both of these. At 606, based on determined characteristics of the monitored access, the LSD determines and stores data indicative of characteristics of the monitored access. For example, the data indicative of characteristics of the monitored access may include counters or other metadata regarding the monitored access, such as access profiles (frequency, access patterns, etc.)

At 608, the data indicative of characteristics of the monitored access is processed. For example, in one scenario, retailers provide the LSD's with preloaded media content and/or encourage downloading of media content, such as via a web site or other mechanism associated with the retailer or a retailer's partner. The data is indicative of characteristics of the monitored access may be provided back to a server associated with the retailer or retailer's partner and then processed in a manner that is valuable, such as to provide targeted proposals from the retailer, to associate usage data with various demographics, or other marketing reasons.

We have thus described a system and method by which an LSD monitors access to the LSD as a result of data access operations by an HD relative to a memory array of the LSD, the LSD determines characteristics of the monitored access, and, based on the characteristics of the monitored access, the LSD determines and stores data on the LSD indicative of the characterized monitored access.

Advantages of the invention are numerous. Different embodiments or implementations may yield one or more of the following advantages. One advantage of the invention is LSD-usage can be monitored without consideration of modifying functionality of the HD. Furthermore, usage statistics can be associated with a particular LSD, even if the LSD is used with multiple HD's.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for a local storage device (LSD) to characterize data access usage of the LSD, wherein the LSD comprises a mass storage memory array and is in communication with a host device (HD), the method comprising the LSD:
   monitoring a pattern of commands received at the LSD from the HD as a result of data access operations by the HD relative to the mass storage memory array of the LSD and monitoring data accessed during the monitored data access operations, wherein such data access operations result in data blocks being provided to or from the mass storage memory array;
   detecting metadata in content of the data accessed during the monitored data access operations that is indicative of a file type associated with the data accessed during the monitored data access operations;
   determining characteristics of the monitored pattern of commands and characteristics of the file type;
   determining, based on the characteristics of the monitored pattern of commands and the characteristics of the file type, data that characterizes the data access operations;
   storing, in a usage area of the LSD, the data that characterizes the data access operations;
   processing the data stored in the usage area that characterizes the data access operations; and
   modifying operation of the LSD based on the processed data.

2. The method of claim 1, wherein the metadata that is indicative of a file type associated with the data accessed during the monitored data access operations comprises a data tag that is indicative of the file type.

3. The method of claim 1, wherein the data that characterizes the data access operations comprises data indicative of time-dependent characteristics of the data access operations on the mass storage memory array.

4. The method of claim 1, further comprising:
   providing, from the LSD to the host device, the data stored on the LSD that characterizes the data access operations.

5. The method of claim 1, further comprising:
   providing, from the LSD to a device other than the LSD and the host device, the data stored on the LSD that characterizes the data access operations.

6. The method of claim 1,
   wherein modifying operation of the LSD comprises modifying a memory management configuration of the LSD.

7. The method of claim 1, wherein:
   the HD includes a host device file system (HDFS); and
   the operations by the HD relative to the mass storage memory array of the LSD include HDFS operations.

8. The method of claim 1, wherein the metadata indicates that the data accessed during the monitored data access operations comprises a photograph.

9. The method of claim 1, wherein the metadata indicates that the data accessed during the monitored data access operations comprises a video.

10. A local storage device (LSD) configured for use in a computing system having a host device (HD) in communication with the local storage device (LSD), the LSD comprising:
    a mass storage memory array having:
      a host data storage area for storing data received from the HD; and
      a usage area for storing data generated by the LSD characterizing data access operations by the HD; and
    a controller configured to manage data access by the HD to the mass storage memory array through a provision of data blocks to or from the host data storage area of the mass storage memory array, the controller further configured to:
      monitor a pattern of commands received at the LSD from the HD as a result of data access operations by the HD relative to the mass storage memory array of the LSD and monitor the data accessed during the monitored data access operations;
      detect metadata in content of the data accessed during the monitored data access operations that is indicative of a file type associated with the data accessed during the monitored data access operations;
      determine characteristics of the monitored pattern of commands and characteristics of the file type;
      determine, based on the characteristics of the monitored pattern of commands and the characteristics of the file type, data that characterizes the data access operations; and store, in the usage area of the LSD, the data that characterizes the data access operations.

11. The LSD of claim 10, wherein the metadata that is indicative of a file type associated with the data accessed during the monitored data access operations comprises a data tag that is indicative of the file type.

12. The LSD of claim 10, wherein the data that characterizes the data access operations comprises data indicative of time-dependent characteristics of the data access operations.

13. The LSD of claim 10, wherein the controller is further configured to:
provide, from the LSD to the host device, the data stored on the LSD that characterizes the data access operations.

14. The LSD of claim 10, wherein the controller is further configured to:
provide, from the LSD to a device other than the LSD and the host device, the data stored on the LSD that characterizes the data access operations.

15. The LSD of claim 10, wherein the controller is further configured to:
process the data stored on the LSD that characterizes the data access operations; and
modify behavior of the LSD based thereon.

16. The LSD of claim 10, wherein:
the operations by the HD relative to the memory array of the LSD include host device file system (HDFS) operations.

17. The LSD of claim 10, wherein the controller is further configured to:
reconfigure a memory management configuration of the LSD, regarding wear-leveling operations on memory cells in the mass storage memory array of the LSD, based on the data stored in the usage area that characterizes the data access operations.

18. The LSD of claim 10, wherein the controller is further configured to:
reconfigure a memory management configuration of the LSD, regarding pre-fetching operations in the mass storage memory array of the LSD, based on the data stored in the usage area that characterizes the data access operations.

19. The LSD of claim 10, wherein the controller is further configured to communicate, via a communication path outside of a host device file system of the HD, the data stored in the usage area to a device external to the HD.

20. A local storage device (LSD) configured for use in a computing system having a host device (HD) in communication with the local storage device (LSD), the LSD comprising:
a mass storage memory array having:
a first storage region for data received from the HD; and
a second storage region defining an area for storing LSD usage data generated by the LSD; and
a controller configured to manage data access by the HD to the mass storage memory array through a provision of data blocks to or from the mass storage memory array, the controller comprising:
means for monitoring a pattern of commands received at the LSD from the HD as a result of data access operations by the HD;
means for determining a file type associated with the data accessed;
means for determining, based on the monitored pattern of commands and the file type, data that characterizes the data access operations;
means for storing, in the second storage region of the LSD, the data that characterizes the data access operations; and
means for reconfiguring a memory management configuration of the LSD based on the data that characterizes the data access operations.

* * * * *